United States Patent Office 3,347,378
Patented Oct. 17, 1967

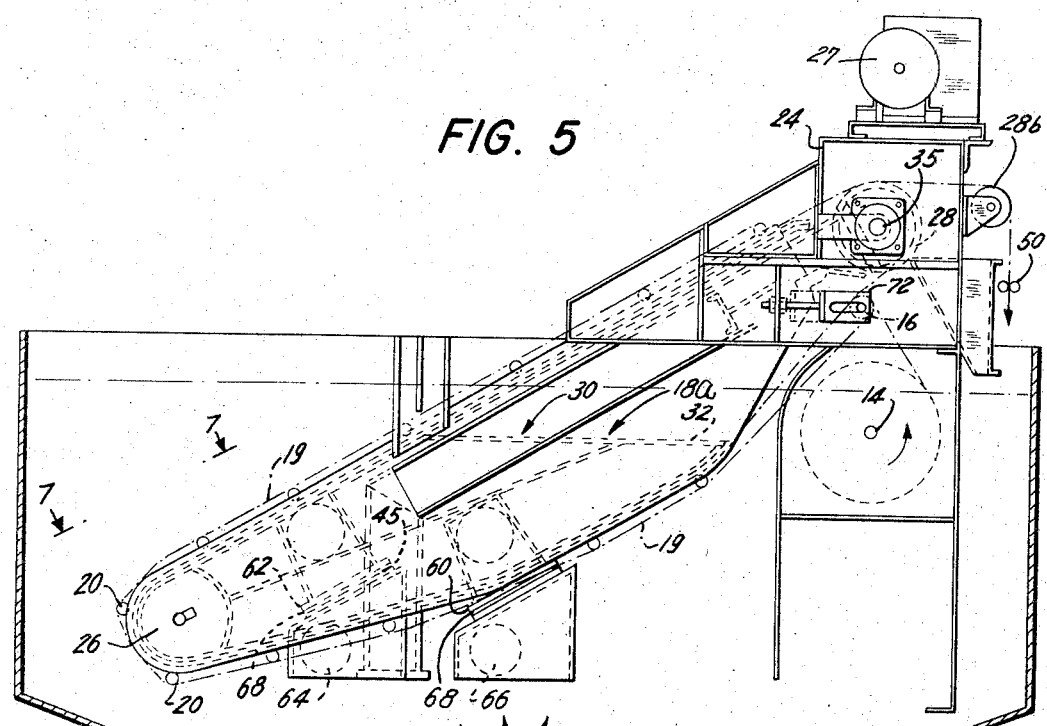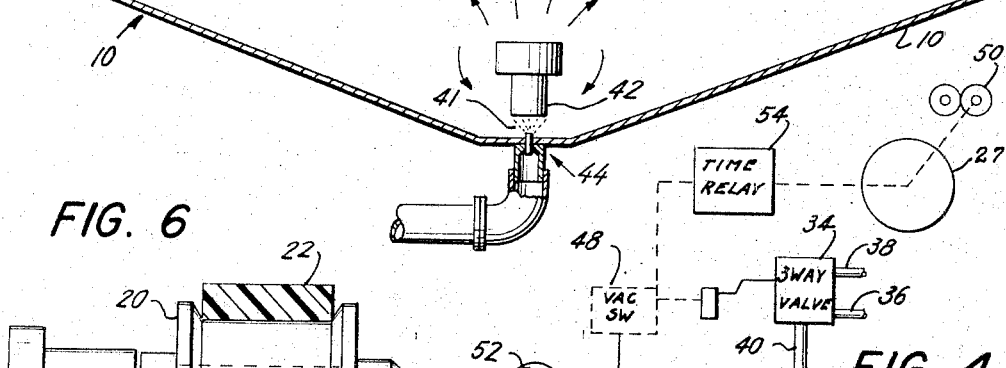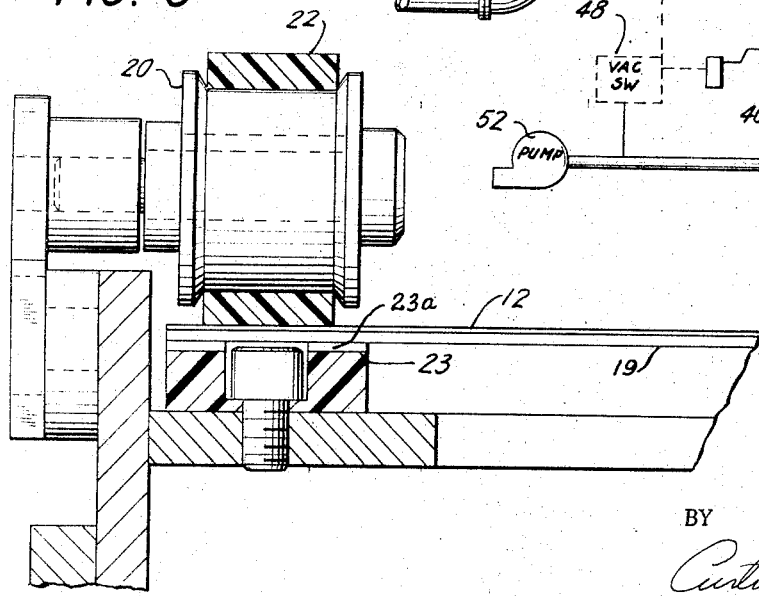

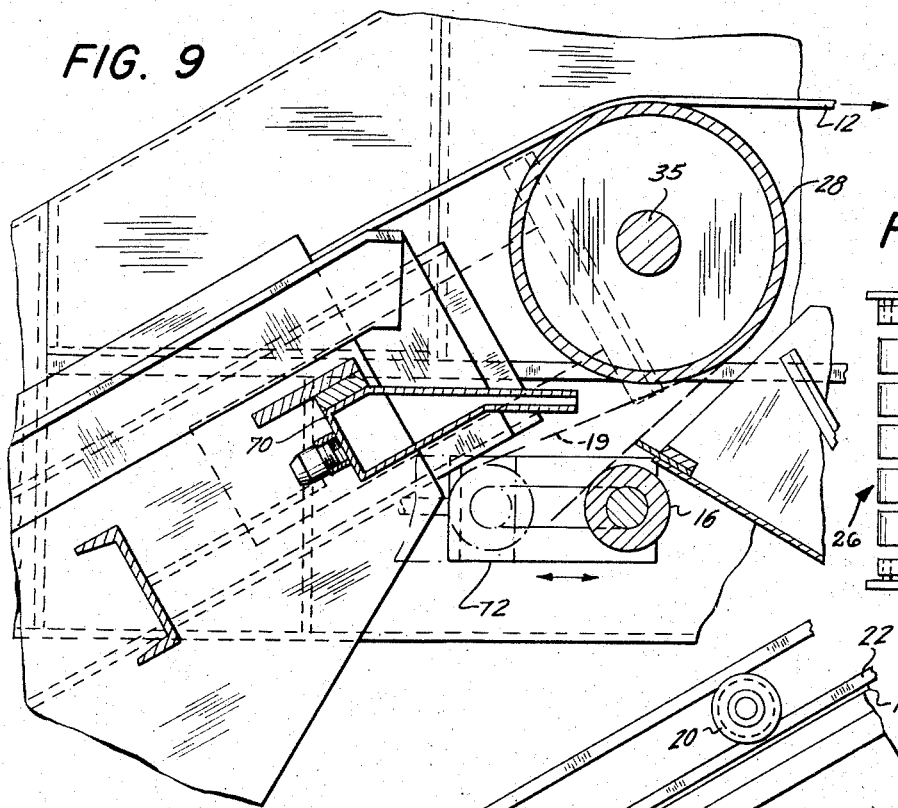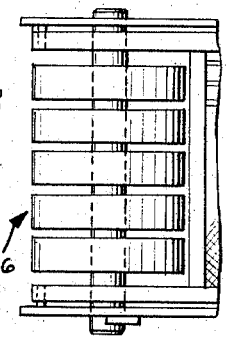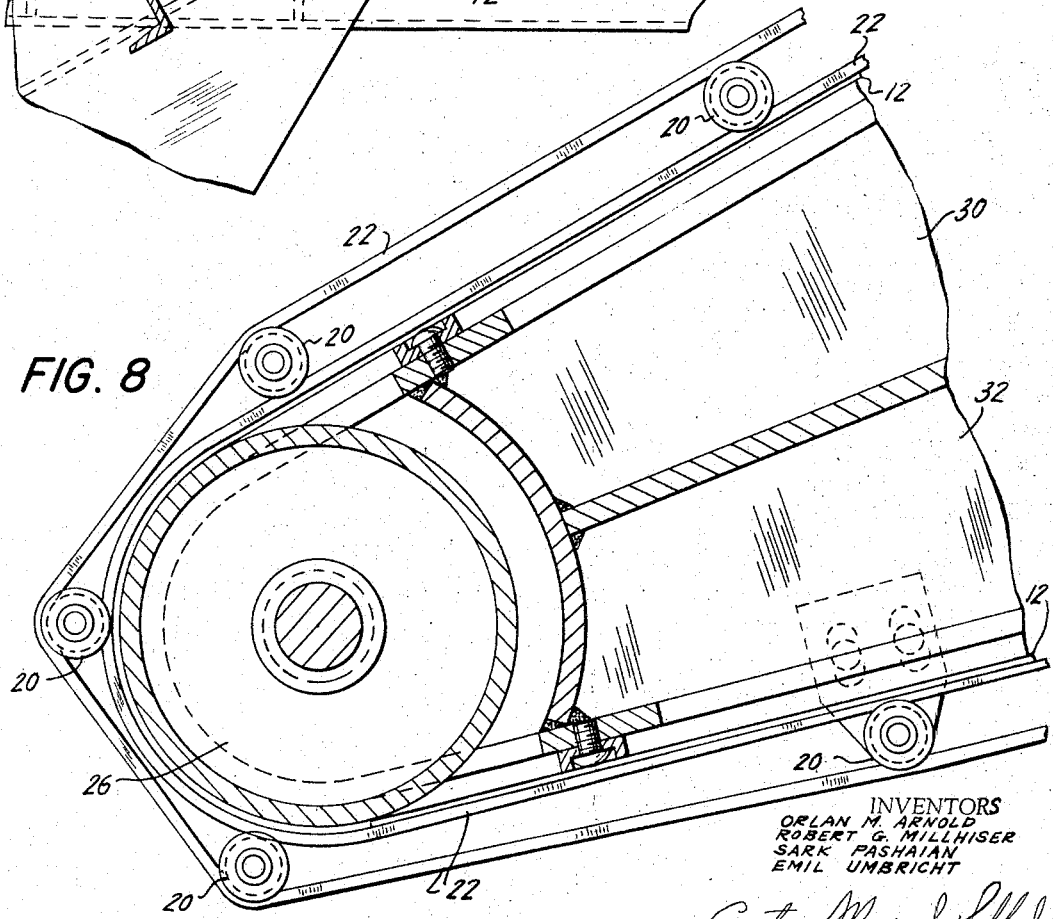

3,347,378
FILTER APPARATUS
Orlan M. Arnold, Grosse Pointe Park, Robert G. Millhiser, Detroit, Sark Pashaian, Monroe, and Emil Umbricht, Northville, Mich., assignors to Ajem Laboratories, Inc., Livonia, Mich.
Filed June 14, 1966, Ser. No. 562,060
9 Claims. (Cl. 210—106)

ABSTRACT OF THE DISCLOSURE

A filtration apparatus having a suction box with one side permeable to passage of liquid is mounted for submersion in liquid to be filtered, an endless flexible screen extends across said pervious face of said box and supports a filter medium thereon, means for supplying a filter medium onto said screen and transporting thereon across said face and away from the tank so that the filtration residue deposited thereon is removed, intermittently or continuously, and disposed of, while the passage of liquid from the tank into the suction box can remain substantially unclogged.

---

This application is a continuation-in-part of application Ser. No. 328,673 filed Dec. 6, 1963, and now abondoned.

The present invention relates to an apparatus for filtering dirty fluids. More particularly, the invention relates to an apparatus for filtering high volumes of fluid, which apparatus is easily maintained and may be operated with a minimum of attention.

Filtration equipment that can be operated with little maintenance is industrially important. For example, in many industrial processing situations, it is undesirable to discard liquids used in the process after a single use. This is sometimes because of direct economic considerations, for example, when the liquid is a relatively expensive cooling oil contaminated by dirt, and sometimes because of more indirect considerations, for example, the desire to avoid a capital expenditure for more water supply lines or the necessity of conserving water induced by restricted local supply, or the necessity of avoiding pollution by discharging wastes.

In such filtration operations, it is important to have a filter that may be operated as long as possible without interrupting the flow of clean fluid, e.g., for cleaning, advancing new filter medium, etc. Unless such down-time can be minimized, it may be necessary, during the filter-shut-down periods, to shut down also the processing operation to which the filtered liquid is being recycled, or to provide an auxiliary filtration unit, or to provide a storage unit maintaining a reservoir of pre-filtered liquid. These methods of mitigating the effects of non-continuous filtration require increased capital investment for greater plant area and for the additional equipment involved. Thus, it is important to have trouble-free continuous filtration equipment.

In choosing machinery for filtering, as with other machinery, it is ordinarily desirable to minimize the number of moving parts and especially to minimize the parts which are subject to corrosion or clogging by the dirty liquid. Thus, it is an advantage of the present invention that we can largely avoid exposing a conveyor mechanism to the liquids and dirt and can make the conveyor section easily accessible for maintenance and cleaning.

It is an object of the present invention to provide filtration equipment that may be operated with minimized maintenance and operator attention.

It is another object of this invention to provide filtration equipment adapted for use of inexpensive filter media and capable, when desired, of heavy-duty filtration operations.

Another object of the invention is to provide a compact filtration unit capable of handling relatively high rates of flow but using only a small plant area.

A further object of the invention is to provide filtration apparatus which minimizes the deposition of sediment within the filtration equipment where it would have to be cleaned out.

Briefly stated, these objects are achieved by disposing a screen belt between a strip of disposable a screen belt between a strip of disposable filter medium and a suction box and applying pressure along the lateral edges of the filter medium toward the suction box to hold the filter medium against the screen belt and, in turn, to hold the screen belt against the lateral edges of the suction box. As the screen belt is driven, the filter medium, being snug against the screen belt, is advanced. The pressure at the lateral edges of the filter medium preferably is applied by a pair of freely movable endless belts. As a result, the two freely movable endless belts move wtih the filter medium so that the filter medium is in contact with surfaces which move with it and there is no frictional drag on the filter medium. The screen belt, normally made of a stronger material than is used for the filter medium, is subjected to any frictional drag which may exist due to the relative movement between the screen belt and the stationary suction box. However, such frictional drag may be reduced by fabricating the contacting surfaces of the suction box and edges of the screen belt with a low-friction material.

In order to facilitate the advance of the filter medium, a second suction box may be included to which the suction is diverted when the filter medium over the first suction box is laden with so much sediment as to call for an advance of the filter medium. While the two suction boxes may be placed in any convenient arrangement, we have shown advantage in having at least one in a position to intercept settling solids, e.g., with its permeable face up, and not more than 60° with the horizontal, and with the filter medium on its upper face located below the vicinity of the soiled liquid inlet. Such a box is most useful as a primary suction box because the movement of dirt toward the filter face by reason of the flow of liquid through the filter face is added to the settling effect of gravity to collect the dirt on the filter medium, not only from liquid actually drawn into the suction box, but also from farther above, dirt being settled through the dirty liquid by gravity.

These features may be used advantageously in our filtration apparatus with a multi-position valve in the suction line and a pressure-sensing device responsive to pressure drop across the filter medium which, at a predetermined pressure drop, causes the valve to shift the suction to a cleaner filter section through which to continue filtration, and also cause the filter medium to be automatically advanced, to move the dirtiest area of the filter medium at least partially away from the suction box.

It is often desirable to have one or more secondary suction boxes positioned in a more or less vertical position, i.e., normal to the surface of the dirty liquid, or in the filter-side-down position causing build-up of settled solids to be substantially avoided, and thus to allow the major amount of filtering at a primary filter position. The secondary suction boxes positioned in this manner have a lower pressure drop across the filter face and thus provide a desirable alternate filter area through which filtration may continue during the advancing of filter medium over the primary filter position. Before such pressure drop is built up at the secondary suction box as would cause difficulty in advancing the filter media, the advancement may be completed and, if desired, the suction may be returned to the primary suction box.

Another feature which may be advantageously utilized for allowing filtration across the low pressure drop during advancement of the filter medium is that wherein a previous face on a first suction box has a smaller area than a pervious face on a second suction box. When suction is switched from the first face to the second face, the total pressure drop is reduced for a time sufficient to allow advancement of the filter media.

A useful feature advantageously incorporated into the apparatus includes a pivoted suction box assembly which is connected to ducts for filtered liquid by means of a flanged connection, gasketed with resilient material such as those disclosed in the commonly-owened and copending United States application of Arnold et al., Ser. No. 17,907, filed Mar. 6, 1962, now U.S. Patent No. 3,166,082.

In this application and accompanying drawings, we have shown and have suggested various alternatives and modifications thereof, but it is to be understood that these are not intended to be exhaustive and that other changes and modifications can be made within the scope of the invention. These suggestions herein are selected and included for purposes of illustration in order that others skilled in the art will more fully understand the invention and the principles thereof and will be enabled to modify it and embody it in a variety of forms, each as may be best suited to the condition of a particular case.

FIGURE 4 is a diagram of the intermittent advancing controls.

FIGURE 5 is a view in vertical section, similar to FIGURE 1, but showing the filter apparatus modified to incorporate a desirable feature helpful in preventing the escape of dirty effluent through the filtrate ducts.

FIGURE 6 is an enlarged vertical section of a filter media hold-down belt and slide-rail assembly taken on line 6—6 of FIGURE 2.

FIGURE 7 is a detail top view of a multiple drum especially useful in aiding the travel of the filter medium.

FIGURE 8 is an enlarged fragmentary section of a portion of the apparatus in FIGURE 1 showing in more detail the lower portion of the filter media hold-down belt and slide-rail assembly.

FIGURE 9 shows partly in section and partly in elevation another portion of the apparatus of FIGURE 5.

Figure 1:
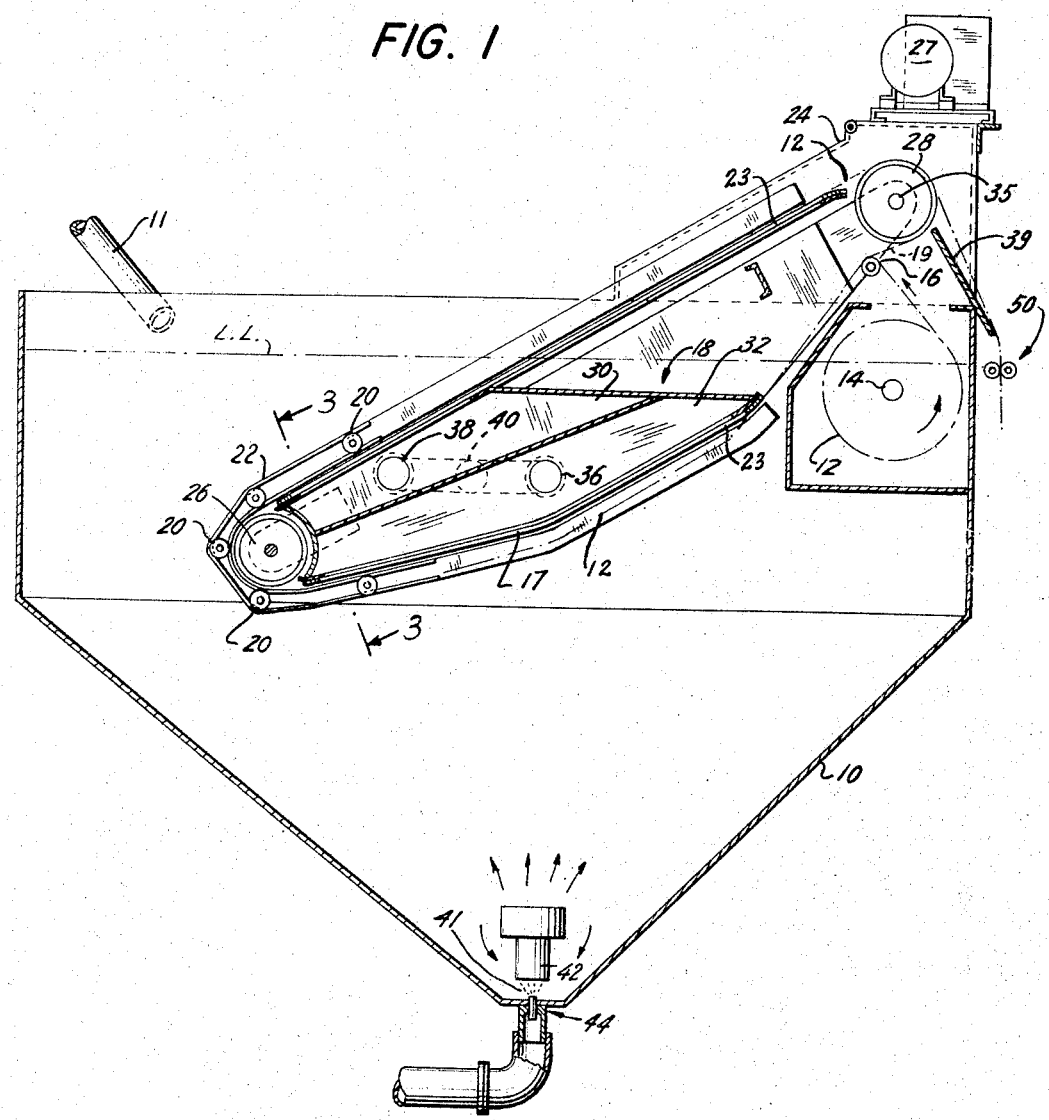
FIGURE 1 is a vertical axial section of filtration equipment constructed in accordance with the present invention.

Referring to FIGURES 1, 2, 3, 6 and 8, filtration equipment constructed in accordance with the present invention includes a tank 10 for holding a mass of liquid to be filtered and at least one suction box assembly 18 within said tank comprising a plurality of suction boxes 30, 32, each with a pervious filter face across one side. Contaminated liquid is introduced into the tank 10 through an inlet 11. A strip of filter medium 12, shown by dot-dash lines in FIGURE 1, is arranged for serial passage over said pervious faces. Ducts 36 and 38 for conveying cleaned fluid run from said suction boxes to a suction pump or other suction means outside the tank.

The filter medium 12 is moved over the pervious faces of the suction boxes 30 and 32 by means of an endless screen belt 19, shown by dashed lines in FIGURE 1, disposed between the filter medium and the suction boxes. The screen belt 19 runs over a pair of rolls 26 and 28.

Figure 3:
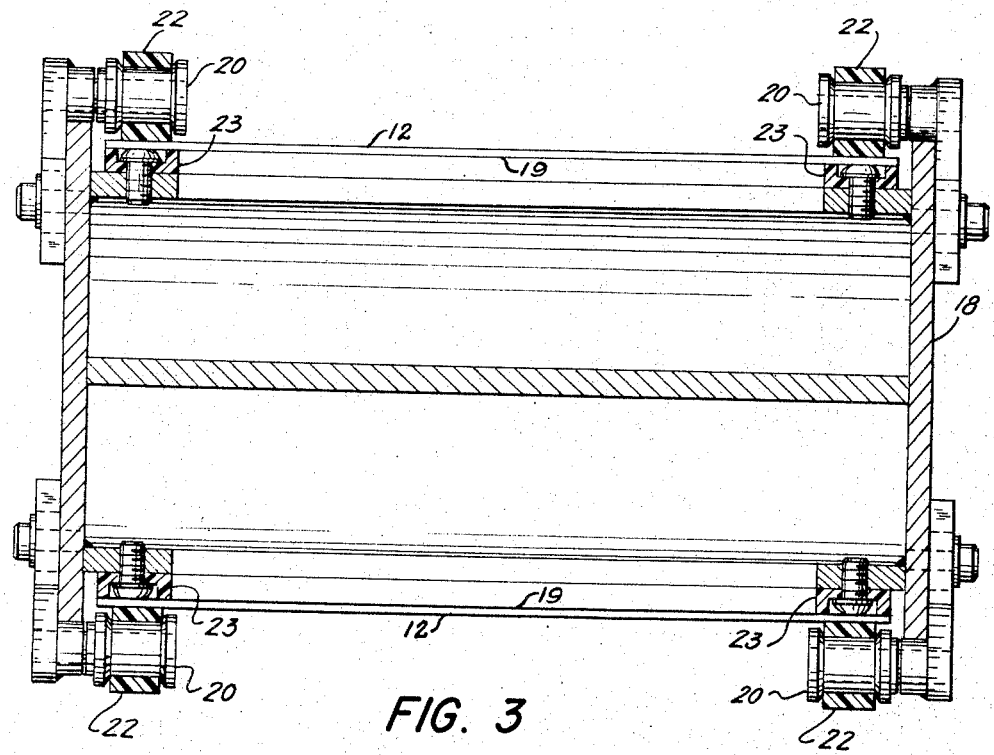
FIGURE 3 is a view of the suction boxes in cross-section taken on line 3—3 of FIGURE 1.

To facilitate the smooth passage of the filter medium 12 and the screen belt 19, a pair of slide-rails 23 is provided along the side edges of the suction boxes 30 and 32. As best illustrated in FIGURES 3 and 6, the screen belt 19 and the filter medium 12 have widths greater than the widths of the pervious filter faces of the suction boxes 30 and 32 so that the lateral edges of the screen belt are in contact with and slide along the slide-rails 23. In FIGURE 3, the filter medium 12 is represented by the single line to which the reference character 12 is directed, while the screen belt 19 is represented by the space between the lines to which reference characters 12 and 19 are directed. The filter medium 12 normally is made of relatively fine and thin paper or cloth so that if represented by double lines in FIGURE 3, it is apt to cause confusion. For the same reason, only the filter medium 12 is identified by reference numerals in FIGURES 1 and 8 along the path over which the filter medium and the screen belt 19 are in contact. The screen belt 19 is identified by reference numeral in FIGURE 1 between roll 28 and an idler roll 16 on the approach to meeting the filter medium 12.

Even if the filter medium 12, which is fed as a long strip from a roll and runs over support rolls to the suction boxes, is tailored to fit the width required by the suction box, the lateral edges of the filter medium may tend to curl away from the suction box during the filtration operation and thus allow some unfiltered liquid to escape into the suction boxes without being properly filtered. Provision is made in the present invention for avoiding this effect by holding the lateral edges of the filter medium down by continuous belts 22, of neoprene, for example, which are located at each of the lateral edges of the filter medium and which bear against the surface of the filter medium opposite from the screen belt 19. The belts 22 may be narrow, like V-belts or O-belts or of other convenient cross-section, adapted to exert the desired pressure on the edges of the filter medium. The belts 22 flex over grooved pulleys 20 mounted on the filter frame at appropriate positions, as shown, so that the belts 22 rotate freely in endless loops. The belts 22 are held taut to maintain the edges of the filter medium 12 in snug contact against the lateral edges of the screen belt 19 and to hold the lateral edges of the screen belt against the slide-rails 23.

As previously indicated, the filter medium 12 normally is made of relatively weak material. On the other hand, the screen belt 19 may be made of a stronger material. The edge sealing assembly just described does not subject the filter medium 12 to frictional drag which might otherwise tear the medium or stretch it to open its pores, since the surfaces (belts 22 and screen belt 19) with which it is contact move with the filter medium. Instead, the frictional drag, if any, between the moving members and the stationary slide-rails 23 is borne by the stronger screen belt 19.

To reduce the friction between the slide-rails 23 and the endless belt 19, the slide-rails preferably are made of a low-friction material. Polymeric materials, for example neoprene, polytetrafluoroethylene such as that known by the trade designation Teflon and polyamide materials such as nylon may be employed because of their resilient properties which contribute to the maintenance of a tight seal. As indicated in FIGURE 6, the entire slide-rail need not be fabricated of a low-friction material. It may be sufficient to treat only the contacting surface of the slide-rails with a strip or layer 23a of low-friction material. This strip may be made of a plastic, laminated metal or stainless steel bonded to the silde-rail. In addition, the lateral edges of the screen belt 19 may be treated, as for example by impregnation, with a low-friction material to facilitate the movement of the screen belt along the slide-rails.

Referring particularly to FIGURE 1, a roll of clean filter medium 12 is placed on a shaft 14. The filter sheet from this roll is fed upward and over the idler roll 16 and then along the bottom pervious face 17 of suction box assembly 18. The neoprene covered V-belts 22 carried on the series of pulleys 20 provide means for maintaining filter medium 12 in snug suction relation to suction box assembly 18 so that the dirty fluid must pass through the filter medium and does not leak under the edges of said filter medium. The open-screen belt 19 passes over the pervious faces of the suction boxes 30 and 32 and around the end of rolls 26 and 28 to carry the filter medium along. A motor 27 drives the roll 28 to move the belt 19.

Filter medium 12, after passing from the suction box 32, is fed around roll 26 and over the upper side of suction box 30 in the assembly 18. The filter medium then passes over roll 28 and along the apron 39 to the squeeze rolls 50, after which the dirty filter medium is discarded.

Figure 2:
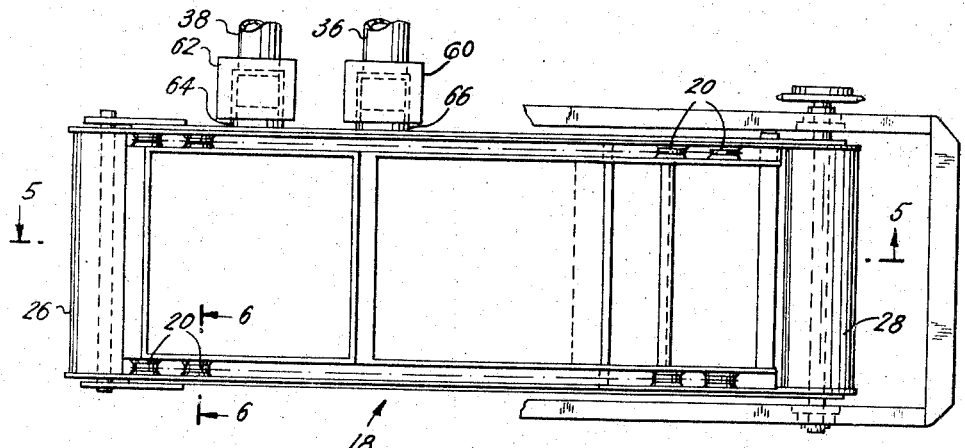
FIGURE 2 is a top plan view of the filtration equipment of FIGURE 1 with a part of the housing and drive parts broken away.

Suction box assembly 18 is normally submerged in the tank 10 in dirty liquid, which is to be cleaned by filtration. Referring to FIGURES 2 and 4, it is seen that the suction boxes respectively are connected to a suction pump 52 through ducts 36 or 38, a three-way valve 34 and a suction duct 40.

Suction box assembly 18 is advantageously pivotally mounted at 35 on the superstructure 24 of the dirty liquid tank 10, as illustrated, for example by FIGURE 5. Thus it can be swung up out of the liquid in tank 10 for cleaning or servicing.

When a dirty liquid to be filtered contains large amounts of sludge or entrained solids of high density, there is a tendency for solids to accumulate on the bottom of the tank. Such accumulations may even reach sufficient height to interfere with the filtration action. Ordinarily this sludge accumulation would have necessitated shut-down for cleaning of the tank. However, with our present invention, this problem is largely avoided by employing means for driving such sediment upward to where it can be caught by the filter. A relatively high velocity liquid jet or jets at the bottom of the tank can keep the soil and solids recirculating up into the effective reach of the filter, before troublesome deposits are formed on the bottom.

A portion of the solids redispersed in this manner will settle on filter areas which have surfaces facing upwards and thus be carried off in the usual manner. With a sufficient rate of recirculation throughout the tank of the liquid to be filtered, nearly all of the material which would ordinarily tend to settle at the bottom of the tank can be carried off on the filtration medium, thus saving time and increasing convenience of operating the filtration equipment.

When utilizing such jets, it is desirable to have a plurality of jets arranged to drive the liquid up in all areas where objectionable settling may occur. The number of jets may be kept down by having the walls of the tank sloped in such a way that sediment tends to move toward the jets.

By such means we have avoided down-time previously required for removal of sludge deposits and avoided also the use of mechanical sludge-conveyors in the filtration equipment. When cleaning is required, it is facilitated by the pivotal mounting of the suction box assembly so that it may be swung out of the liquid contained in the tank.

At the bottom of tank 10 is a sediment-recirculating impeller, shown in this instance as comprising a short open pipe 42 stepped to a larger diameter, and a liquid jet nozzle 41. Liquid is supplied under pressure to the jet nozzle by a pump (not shown) or from any suitable liquid pressure supply.

After the filter medium 12 has been initially threaded through the equipment, and suction box apparatus 18 has been submerged in the dirty liquid, the apparatus is operated as follows:

Suction is pulled on upper suction box 30 through line 40, three-way valve 34 and line 38 (see FIGURE 4), causing liquid to be drawn into the upper suction box through filter medium 12, by which the liquid passing through it is cleaned of dirt and suspended solids. As this filtering procedure continues, clean liquid is carried off thruogh line 38, valve 34 and line 40 to be reused. The amount of sediment and dirt gradually increases on the filter medium 12 positioned over upper suction box 30 until the pressure drop across the dirty medium reaches a predetermined magnitude. A switch 48 (see FIGURE 4) then activates a driving means of valve 34 to shift it so that the suction is diverted to line 36, instead of 38. Thus the vacuum is pulled on lower suction box 32; and, for an interim period, liquid is filtered throguh the filter medium covering the lower suction box. The pressure-responsive control switch 48 also, either directly or through a delay device, initiates operation of a motor to move the filter sheet 12 forward one step, e.g., equal to the length of the filter face. Control switch 48 may be a differential pressure switch sensing pressures both inside the suction box 30 and in the tank external to the suction box; or it may sense only the pressure inside the box and operate on the assumption that the pressure in the tank will remain substantially constant.

Because the amount of sediment and dirt on the fresh filter medium at the lower suction box 32 is initially very small, and also because the area of the suction face on box 32 is relatively large, the pressure drop through the filter medium is relatively low when the suction is thus diverted. This low pressure drop allows filter medium 12 to be advanced along the suction box with so little resistance as to avoid tearing.

During this advance of the filter medium, the area thereof which carries the greatest load of residue, i.e. the area of the medium which has rested on the upper suction box, passes beyond the suction box and is replaced by an area of the medium brought up from below around the end roll 26. This movement is accomplished advantageously by means of the screen belt 19 which runs over the rolls 26 and 28 and carries the filter medium over the pervious face.

The squeeze rolls 50, driven by motor 27 (see FIGURE 4), are actuated advantageously by closing a time-delay switch 54 that has, in turn, been activated by pressure switch 48.

A typical control operation is shown schematically in FIGURE 4. The vacuum in the suction duct 40, connected to the inlet side of suction pump 52, operates the pressure switch 48 when a predetermined vacuum has been reached due to clogging of the filter sheet 12. Switch 48 energizes both the three-way valve 34 and a time-delay switch 54. The time-delay switch may delay energizing motor 27 for sufficient time to allow the three-way valve 34 to be operated to cut off suction from the lower chamber 32 and for enough fluid to pass through the medium 12 to substantially reduce the suction on the medium before the drive for rolls 26, 28 and 50 is energized.

When the predetermined advance of the filter medium is complete, the switch 48 acts to operate valve 34 to again divert the suction so that liquid flows into and from upper suction box 30, and the above-described process is repeated. Thus, a continuous supply of clean liquid is always assured to the process line being fed by the filtration apparatus.

This diversion may be by the same or another time-delay switch (or cycle control switch) set for a sufficient period to allow the predetermined transfer of the filter sheet to its next position; or it may be actuated by feeler means directly responsive to completion of the transfer movement.

Referring to FIGURE 5, flanges 60 and 62 are advantageously utilized on filtrate inlet ports 64 and 66 to form a flanged connection. These ports are connected to suction lines 38 and 36 and provide an improved method of sealing the suction lines against unfilter fluid leaking in from tank 10. Flanges 60 and 62 are advantageously gasketed with resilient gaskets 68.

This method of sealing the suction lines is particularly advantageous when the assembly 18a is pivoted at 35 for swinging up out of the liquid. The flanges 60, 62 are substantially normal to a radius from said pivot so that the weight of the assembly may bear against resilient gaskets 68 and assure sealing pressure on the flanges.

When using this feature, one seals the line 40 or both suction lines 38 and 36 before raising the filter apparatus for servicing. Failure to do this will allow quantities of dirty water to flow into the filtrate outlet ducts.

FIGURE 7 shows desirable structure for roll 26. Other desirable structures include a grooved outer surface and squirrel-cage-type design with cylindrically arranged rods.

FIGURE 9 shows an enlarged view of the upper portion of the filter assembly, showing an air blow-off cleaning device 70 for cleaning screen belt 19 and a tension adjusting device 72 for belt 19.

While there has been described what is at present considered to be the preferred embodiment of this invention it will be obvious to those skilled in the art that various changes and modifications may be made therein without departing from the invention and it is, therefore, aimed to cover all such changes and modifications as fall within the true spirit and scope of the invention.

What is claimed is:

1. A filtration apparatus having a tank for holding a mass of liquid to be filtered, a first suction box within said tank having a first pervious face facing upwards to form a sediment-receiving surface, a second suction box within said tank having a second pervious face of greater area than said first pervious face, said second pervious face facing downward, a strip of filter medium arranged at said pervious faces for serial passage thereover, means, including an endless screen belt disposed between said filter medium and said pervious filter faces, for moving said filter medium across said pervious faces, a suction-producing means connected to said suction boxes, suction-diverting means for changing suction from one suction box to another, and pressure-sensing means for activating said suction-diverting means and said moving means in response to reduced pressure within said first suction box.

2. A filtration apparatus as in claim 1 wherein said means for moving said filter medium is operatively connected to said pressure-sensing means for activating said moving means and deactivating said moving means responsive to pressure differential across said filter medium.

3. A filtration unit comprising:
  a tank for holding liquid to be filtered;
  a suction box within said tank and having lateral edges between which a pervious filter face extends;
  a strip of filter medium arranged for passage over said pervious filter face and having a width greater than the width of said pervious filter face;
  an endless screen belt disposed between said filter medium and said pervious filter face and having a width greater than the width of said pervious filter face;
  a pair of freely movable endless belts, one located at each of the lateral edges of said strip of filter medium, which bear against the surface of said filter medium opposite from said endless screen belt to hold said lateral edges of said filter medium against the lateral edges of said endless screen belt and to hold said lateral edges of said endless screen belt against the lateral edges of said suction box;
  and means for moving said endless screen belt across said pervious filter face to pass said strip of filter medium over said pervious filter face.

4. A filtration unit according to claim 3 wherein the suction box has low-friction slide-rails along its lateral edges against which the endless screen belt bears.

5. A filtration apparatus having a tank for holding a mass of liquid to be filtered, an inlet thereto for dirty fluid, at least one suction box within said tank, a pervious filter face across said suction box, a strip of filter medium arranged at said pervious face for serial passage over said suction box, means, including an endless screen belt disposed between said filter medium and said pervious filter face, for moving said filter medium over said suction box across said pervious face, pressure-sensing means for activating said moving means in response to reduced pressure within said suction box, ducts for filtered liquid leading from said suction box through and out of said tank, and suction producing means connected to said suction box, the combination therewith of a pair of edge-sealing, freely movable endless belts along the lateral edge portions of said filter medium, said freely movable endless belts applying pressure to the outside of the filter medium toward said suction box and a slide-rail mounted upon said suction box at the periphery of its pervious face to hold said filter medium against said endless screen belt.

6. Apparatus as defined in claim 5 which further comprises means for recirculating sediment from near the bottom of the tank back to a higher altitude in the tank above the filter face of the suction box.

7. Apparatus as defined in claim 5 wherein a suction box, filter medium and means for advancing the filter medium are comprised in a unit assembly pivotally mounted for swinging up out of the liquid and down into the tank.

8. Apparatus as defined in claim 7 wherein said ducts for filtered liquid comprise a flanged connection gasketed with resilient material upon which the weight of a pivoted filter assembly bears assuring sealing pressure on said flanged connection.

9. Apparatus as defined in claim 7 wherein each of said ducts for filtered liquid is separable in a direction parallel to the swinging movement of the suction box assembly.

References Cited

UNITED STATES PATENTS

| | | | |
|---|---|---|---|
| 642,460 | 1/1900 | Kersten | 210—220 X |
| 726,052 | 4/1903 | Hagenmuller | 210—220 |
| 2,720,973 | 10/1955 | Gross | 210—387 X |
| 2,812,065 | 11/1957 | Wilson. | |
| 2,867,324 | 1/1959 | Hirs | 210—387 X |
| 3,083,831 | 4/1963 | Fowler | 210—111 |
| 3,087,620 | 4/1963 | Hirs | 210—387 X |
| 3,091,336 | 5/1963 | Hirs | 210—416 X |
| 3,221,885 | 12/1965 | Hirs | 210—298 |

FOREIGN PATENTS

| | | |
|---|---|---|
| 1,146,383 | 5/1957 | France. |

REUBEN FRIEDMAN, *Primary Examiner.*

D. M. RIESS, *Assistant Examiner.*